(12) United States Patent
Lukas et al.

(10) Patent No.: US 9,069,888 B2
(45) Date of Patent: *Jun. 30, 2015

(54) TRACKING ERRORS IN A COMPUTING SYSTEM

(71) Applicant: INTERNATIONAL BUSINESS MACHINES CORPORATION, Armonk, NY (US)

(72) Inventors: Joshua Lukas, Mazeppa, MN (US); Gary R. Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/803,844

(22) Filed: Mar. 14, 2013

(65) Prior Publication Data

US 2014/0281745 A1 Sep. 18, 2014

(51) Int. Cl.
*G06F 11/00* (2006.01)
*G06F 11/34* (2006.01)
*G06F 11/07* (2006.01)

(52) U.S. Cl.
CPC ............ *G06F 11/34* (2013.01); *G06F 11/0757* (2013.01)

(58) Field of Classification Search
CPC .................................................. G06F 11/0757
USPC ..................................................... 714/48, 55
See application file for complete search history.

(56) References Cited

U.S. PATENT DOCUMENTS

| 6,046,979 | A  | * | 4/2000 | Bauman ......................... 370/229 |
| 6,885,632 | B1 | * | 4/2005 | Mattson ......................... 370/216 |
| 7,707,464 | B2 | * | 4/2010 | Gilgen et al. ..................... 714/55 |
| 7,739,551 | B2 | * | 6/2010 | Eickmeyer et al. ........... 714/38.1 |
| 7,890,814 | B2 | * | 2/2011 | Zhang et al. ..................... 714/45 |
| 2009/0006883 | A1 | * | 1/2009 | Zhang et al. ....................... 714/1 |
| 2009/0132869 | A1 | * | 5/2009 | Gilgen et al. .................... 714/55 |

* cited by examiner

*Primary Examiner* — Joshua P Lottich
(74) *Attorney, Agent, or Firm* — Kennedy Lenart Spraggins LLP

(57) ABSTRACT

Tracking errors in a computing system that includes a plurality of current error buckets and a plurality of historical error buckets, including: inserting, by an error repository manager into a current error bucket, error information describing a first error identified by a timestamp; moving, by the error repository manager, the error information in the current error bucket to a historical error bucket upon the expiration of the bucket interval, wherein each historical error bucket has a storage interval determined in dependence upon the base time interval associated with the error and a bucket number associated with the historical error bucket; and moving, by the error repository manager, the error information in a source historical error bucket to a destination historical error bucket upon the expiration of the storage interval associated with the source historical error bucket.

11 Claims, 4 Drawing Sheets

TRACKING ERRORS IN A COMPUTING SYSTEM

BACKGROUND OF THE INVENTION

1. Field of the Invention

The field of the invention is data processing, or, more specifically, methods, apparatus, and products for tracking errors in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems may generate errors that are used to analyze and correct the operation of the computing system. Error thresholding is common practice for handling hardware error interrupts in firmware. A threshold is composed of a time-interval in which an error-limit must be reached in order for the computing system to take some repair action. Typically, a computing system can capture a timestamp of the first error and count errors until the error-limit is reached or an error occurs outside the current time-interval thus defining a new starting timestamp and beginning a new interval. This algorithm is efficient for space utilization but is neither an exact representation of errors-per-interval nor does it provide any mechanism for correlating errors to user actions.

SUMMARY OF THE INVENTION

Methods, apparatuses, and products for tracking errors in a computing system that includes a plurality of current error buckets and a plurality of historical error buckets, including: inserting, by an error repository manager into a current error bucket, error information describing a first error identified by a timestamp, wherein the current error bucket is associated with a bucket interval determined using a base time interval associated with the error measured from the timestamp; moving, by the error repository manager, the error information in the current error bucket to a historical error bucket upon the expiration of the bucket interval, wherein each historical error bucket has a storage interval determined in dependence upon the base time interval associated with the error and a bucket number associated with the historical error bucket; and moving, by the error repository manager, the error information in a source historical error bucket to a destination historical error bucket upon the expiration of the storage interval associated with the source historical error bucket.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
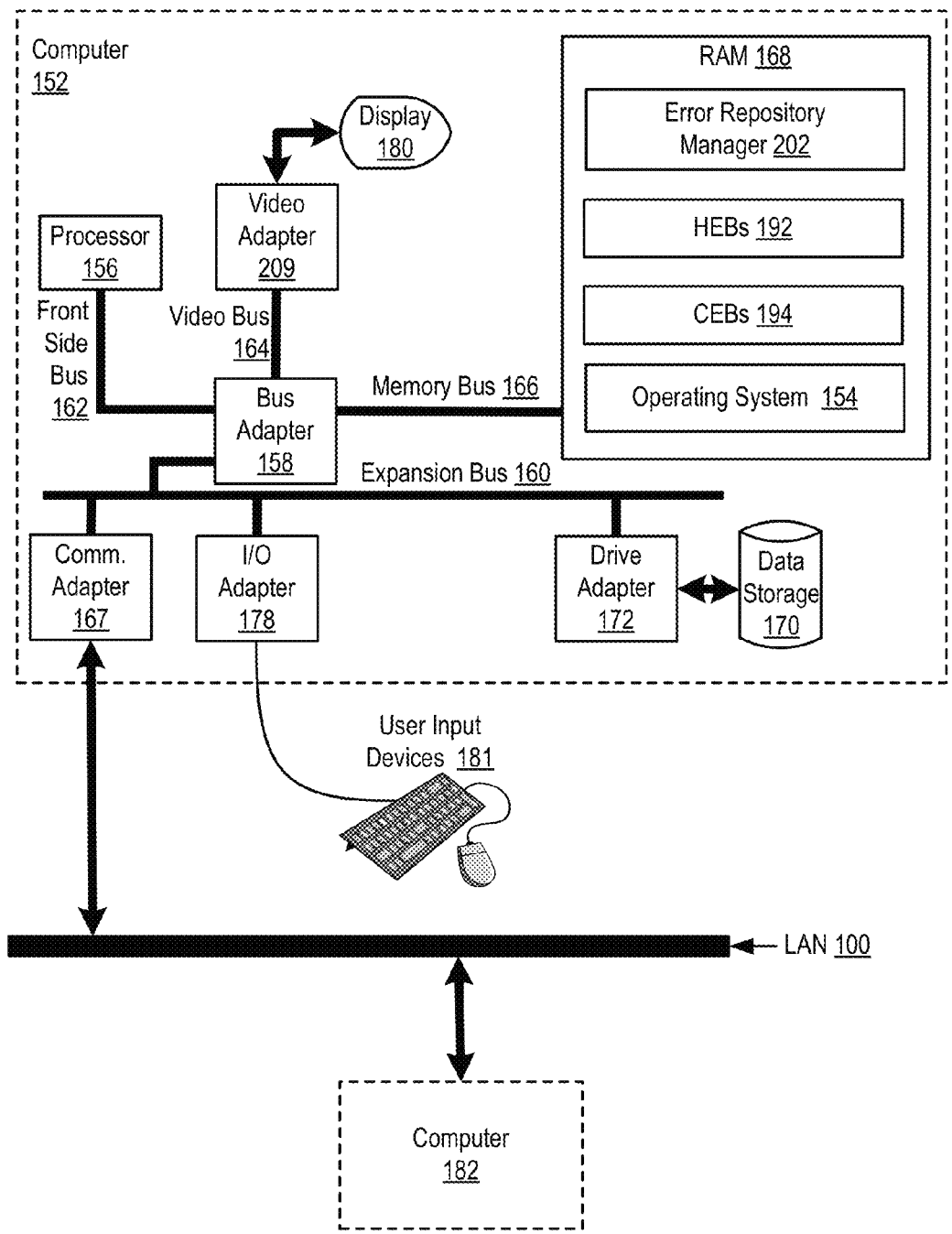
FIG. 1 sets forth a block diagram of automated computing machinery comprising an example computer useful in tracking errors in a computing system that includes a plurality of current error buckets and a plurality of historical error buckets according to embodiments of the present invention.

Example methods, apparatus, and products for tracking errors in a computing system that includes a plurality of current error buckets (194) and a plurality of historical error buckets (192) in accordance with the present invention are described with reference to the accompanying drawings, beginning with FIG. 1. FIG. 1 sets forth a block diagram of automated computing machinery comprising an example computer (152) useful in tracking errors in a computing system that includes a plurality of current error buckets (194) and a plurality of historical error buckets (192) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an error repository manager (202), a module of computer program instructions for tracking errors in a computing system that includes a plurality of current error buckets (194) and a plurality of historical error buckets (192) according to embodiments of the present invention. An error may represent the occurrence of an undesirable action. Errors may be generated by any of the computing devices in the computer (152) and may include information such an error code that identifies the nature of the error, a timestamp that identifies the time when the error occurred, information identifying the state of one or more variables when the error occurred, information identifying the computing device that generated the error, and other information as will occur to those of skill in the art.

The computer (152) of FIG. 1 includes a plurality of current error buckets (194). The current error buckets (194) may be embodied, for example, as a data structure such as an array, linked list, or other data structure. The current error buckets (194) may be configured to store error information describing errors that occurred within a time interval. The time interval associated with each current error bucket (194) may be of the same duration but measured from a distinct starting time. In particular, each current error bucket (194) may be associated with a timestamp that identifies the time at which the first error in a particular current error bucket (194) occurred. The time interval associated with the particular current error bucket (194) can begin at the timestamp value and end at a predetermined amount of time after the timestamp value, where the predetermined amount of time after the timestamp value is set to a base time interval associated with the error.

The computer (152) of FIG. 1 also includes a plurality of historical error buckets (192). The historical error buckets (192) may be embodied, for example, as a data structure such as an array, linked list, queue, or other data structure. The historical error buckets (192) may be configured to store error information describing an error that occurred outside of the set of time intervals associated with the current error buckets (194). In particular, each historical error bucket (192) has a storage interval determined in dependence upon the base time interval associated with the error, a bucket number associated with the historical error bucket (192), and a timestamp for the first error in the historical error bucket (192).

The error repository manager (202) can track errors in a computing system by inserting, into a current error bucket, error information describing a first error identified by a timestamp, moving the error information in the current error bucket to a historical error bucket upon the expiration of the bucket interval, and moving the error information in a source historical error bucket to a destination historical error bucket upon the expiration of the storage interval associated with the source historical error bucket.

Also stored in RAM (168) is an operating system (154). Operating systems useful in tracking errors in a computing system that includes a plurality of current error buckets (194) and a plurality of historical error buckets (192) according to embodiments of the present invention include UNIX™, Linux™, Microsoft XP™, AIX™, IBM's i5/OS™, and others as will occur to those of skill in the art. The operating system (154) and the error repository manager (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for tracking errors in a computing system that includes a plurality of current error buckets (194) and a plurality of historical error buckets (192) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for tracking errors in a computing system that includes a plurality of current error buckets (194) and a plurality of historical error buckets (192) according to embodiments of the present invention include modems for wired dial-up communications, Ethernet (IEEE 802.3) adapters for wired data communications network communications, and 802.11 adapters for wireless data communications network communications.

Figure 2:
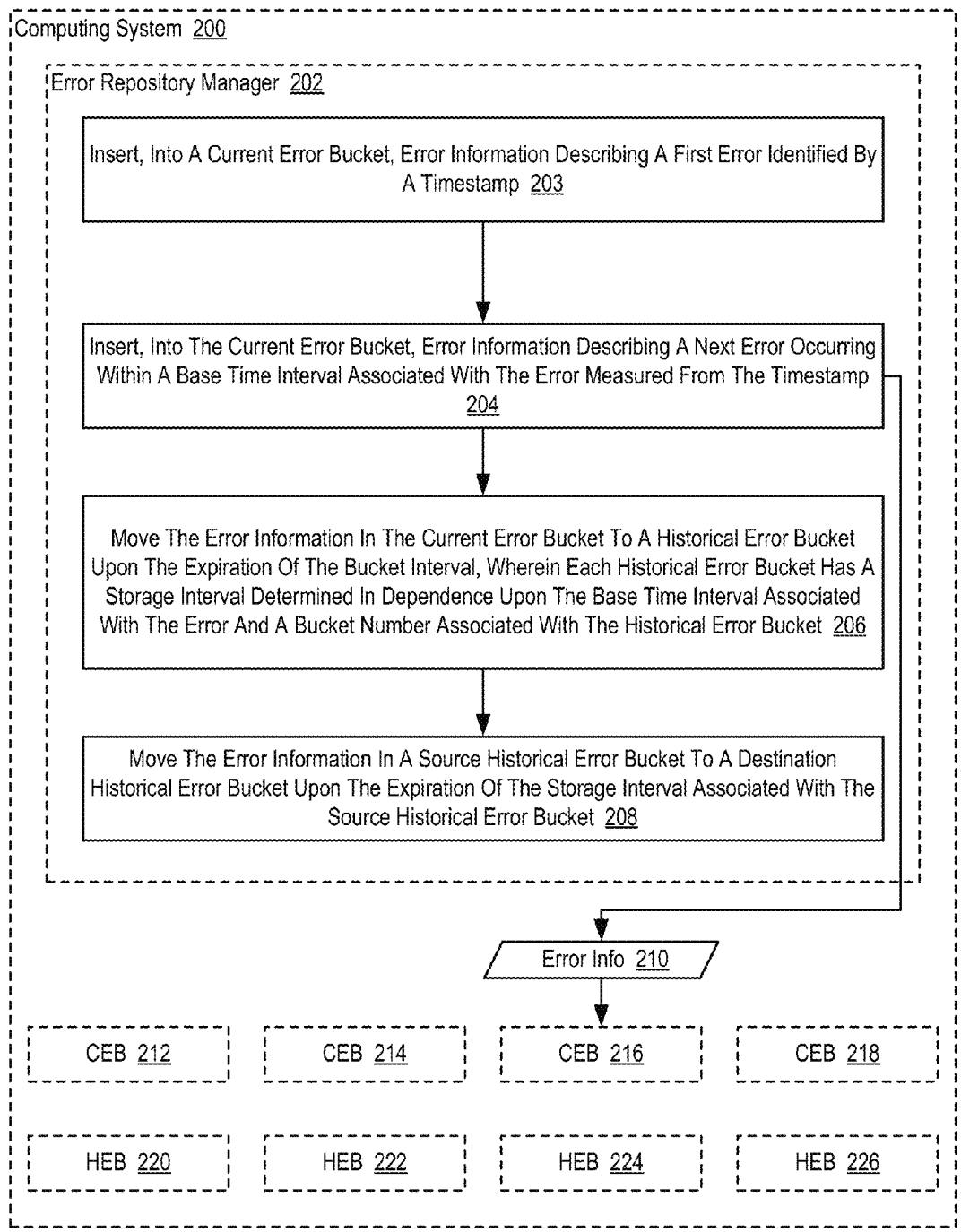
FIG. 2 sets forth a flow chart illustrating an example method for tracking errors in a computing system according to embodiments of the present invention.

For further explanation, FIG. 2 sets forth a flow chart illustrating an example method for tracking errors in a computing system (200) according to embodiments of the present invention. In the example method of FIG. 2, each error may represent the occurrence of an undesirable action. Errors may be generated by any of the computing devices in the computing system (200) and may include information such as an error code that identifies the nature of the error, a timestamp that identifies the time when the error occurred, information identifying the state of one or more variables when the error occurred, information identifying the computing device that generated the error, and other information as will occur to those of skill in the art.

The computing system (200) of FIG. 2 includes a plurality of current error buckets (212, 214, 216, 218). In the example method of FIG. 2, the current error buckets (212, 214, 216, 218) may be embodied, for example, as a data structure such as an array, linked list, or other data structure. The current error buckets (212, 214, 216, 218) may be configured to store error information (210) describing errors that occurred within a time interval. The time interval associated with each current error bucket (212, 214, 216, 218) may be of the same duration but measured from a distinct starting time. In particular, each current error bucket (212, 214, 216, 218) may be associated with a timestamp that identifies the time at which the first error in a particular current error bucket (212, 214, 216, 218) occurred. The time interval associated with the particular current error bucket (212, 214, 216, 218) can begin at the timestamp value and end at a predetermined amount of time after the timestamp value.

Consider an example in which the base time interval for tracking errors is set to 30 seconds. In such an example, assume that the first error in current error bucket (212) had a timestamp of 15 seconds after the computing system (200) was powered on. In the same example, assume that the first error in another current error bucket (214) had a timestamp of 20 seconds after the computing system (200) was powered on. In such an example, current error bucket (212) would include error information (210) associated with errors that occurred between 15 seconds after the computing system (200) was powered on and 45 seconds after the computing system (200) was powered on. Current error bucket (214), however, would include error information (210) associated with errors that occurred between 20 seconds after the computing system (200) was powered on and 50 seconds after the computing system (200) was powered on. In such a way, each current error bucket (212, 214, 216, 218) can track error information (210) associated with a distinct time interval. In such a way, the current error buckets (212, 214, 216, 218) may be monitored to determine whether an error threshold has been exceeded during the time interval that is associated with a particular current error bucket (212, 214, 216, 218).

The computing system (200) of FIG. 2 also includes a plurality of historical error buckets (220, 222, 224, 226). In the example method of FIG. 2, the historical error buckets (220, 222, 224, 226) may be embodied, for example, as a data structure such as an array, linked list, queue, or other data structure. The historical error buckets (220, 222, 224, 226)

may be configured to store error information (210) describing an error that occurred outside of the set of time intervals associated with the current error buckets (212, 214, 216, 218). In particular, each historical error bucket (220, 222, 224, 226) has a storage interval determined in dependence upon the base time interval associated with the error, a bucket number associated with the historical error bucket (220, 222, 224, 226), and a timestamp for the first error in the historical error bucket (220, 222, 224, 226).

In the example method of FIG. 2, each historical error bucket (220, 222, 224, 226) is assigned a bucket number. For example, historical error bucket (220) may be designated as bucket number 1, historical error bucket (222) may be designated as bucket number 2, historical error bucket (224) may be designated as bucket number 3, and historical error bucket (226) may be designated as bucket number 4. In such an example, a historical error bucket (220, 222, 224, 226) with a lower bucket number can store error information (210) associated with more recently occurring errors wile a historical error bucket (220, 222, 224, 226) with a higher bucket number can store error information (210) associated with less recently occurring errors. The storage interval associated with a historical error bucket (220, 222, 224, 226) can determined using the base time interval associated with the error, a bucket number associated with the historical error bucket (220, 222, 224, 226), and a timestamp for the first error in the historical error bucket (220, 222, 224, 226).

Consider the example described above in which the base time interval associated with the error is set to 30 seconds and historical error bucket (220) is bucket number 1, historical error bucket (222) is bucket number 2, historical error bucket (224) is bucket number 3, and historical error bucket (226) is bucket number 4. In such an example, assume that the duration of a storage interval for each historical error bucket (220, 222, 224, 226) is determined by using the following formula:

Duration of storage interval=2*Base Time Interval^Bucket Number

In such an example, historical error bucket (220) would have a storage interval that is 60 seconds (2*30^1) in duration, historical error bucket (222) would have a storage interval that is 1800 seconds (2*30^2) in duration, historical error bucket (224) would have a storage interval that is 54000 seconds (2*30^3) in duration, and historical error bucket (226) would have a storage interval that is 1620000 seconds (2*30^4) in duration. Each historical error bucket (220, 222, 224, 226) may be configured to store error information (210) describing errors that occurred within a storage interval that is determined by adding the duration of the storage interval for a particular historical error bucket (220, 222, 224, 226) to the timestamp of the first error in the historical error bucket (220, 222, 224, 226). For example, if the first error in historical error bucket (222) had a timestamp indicating that the error occurred 100 seconds after the computing system (200) was powered on, the storage interval associated with historical error bucket (222) would begin 100 seconds after the computing system (200) was powered on and would end 1900 seconds after the computing system (200) was powered on, by virtue of historical error bucket (222) having a storage interval that is 1800 seconds in duration.

The example method of FIG. 2 includes inserting (203), by an error repository manager (202) into a current error bucket (212, 214, 216, 218), error information (210) describing a first error identified by a timestamp. In the example method of FIG. 2 each current error bucket (212, 214, 216, 218) is initially empty. As such, at some point in time a first error may be inserted (203) in the current error bucket (212, 214, 216, 218). The first error can be identified by a timestamp that specifies when the first error occurred. In such an example, the timestamp is used to determine the bucket interval that all errors in a particular current error bucket (212, 214, 216, 218) have occurred within. That is, the bucket interval that all errors in a particular current error bucket (212, 214, 216, 218) have occurred within is determined using a base time interval associated with the error measured from the timestamp. For example, if the base time interval associated with the error is set to 30 seconds and the first error in current error bucket (212) had a timestamp of 15 seconds after the computing system (200) was powered on, the current error bucket (212) would include error information (210) associated with errors that occurred between 15 seconds after the computing system (200) was powered on and 45 seconds after the computing system (200) was powered on.

The example method of FIG. 2 also includes inserting (204), by an error repository manager (202) into a current error bucket (212, 214, 216, 218), error information (210) describing a next error occurring within the bucket interval. In the example method of FIG. 2, inserting (204) error information (210) into a current error bucket (212, 214, 216, 218) may be carried out, for example, by identifying the bucket interval associated with a particular current error bucket (212, 214, 216, 218) and determining whether the next error occurred within the bucket interval associated with a particular current error bucket (212, 214, 216, 218).

Consider the example described above in which the base time interval for tracking errors is set to 30 seconds. In such an example, assume that the first error in current error bucket (212) had a timestamp of 15 seconds after the computing system (200) was powered on. In the same example, assume that the first error in current error bucket (214) had a timestamp of 20 seconds after the computing system (200) was powered on. In such an example, current error bucket (212) would include error information (210) associated with errors that occurred between 15 seconds after the computing system (200) was powered on and 45 seconds after the computing system (200) was powered on while current error bucket (214) would include error information (210) associated with errors that occurred between 20 seconds after the computing system (200) was powered on and 50 seconds after the computing system (200) was powered on. In such an example, if a next error occurred 47 seconds after the computing system (200) was powered on, error information associated with the next error would be inserted into current error bucket (214) but not into current error bucket (212). Readers will appreciate that in other examples, however, the error information associated with the next error may be inserted into multiple current error buckets (212, 214, 216, 218).

The example method of FIG. 2 also includes moving (206), by the error repository manager (202), the error information (210) in the current error bucket (212, 214, 216, 218) to a historical error bucket (220, 222, 224, 226) upon the expiration of the bucket interval. As described above, each historical error bucket (220, 222, 224, 226) has a storage interval determined in dependence upon the base time interval associated with the error, a bucket number associated with the historical error bucket (220, 222, 224, 226), and the timestamp of the first entry in the historical error bucket (220, 222, 224, 226). Each historical error bucket (220, 222, 224, 226) can therefore contain error information for errors that occurred within the storage interval that is associated with the historical error bucket (220, 222, 224, 226). In such an example, moving (206) the error information (210) in the current error bucket (212, 214, 216, 218) to a historical error bucket (220, 222, 224, 226) upon the expiration of the bucket interval may be carried out by moving (206) the error information (210) in the current error bucket (212, 214, 216, 218) into the historical error bucket (220, 222, 224, 226) with the shortest storage interval. For example, in the embodiment described above where historical error bucket (220) is designated as bucket number 1 and historical error bucket (220) had the shortest storage interval, moving (206) the error information (210) in the current error bucket (212, 214, 216, 218) to a historical error bucket (220, 222, 224, 226) upon the expiration of the bucket interval would be carried out by moving the error information (210) in the current error bucket (212, 214, 216, 218) to historical error bucket (220).

The example method of FIG. 2 also includes moving (208), by the error repository manager (202), the error information (210) in a source historical error bucket (220, 222, 224, 226) to a destination historical error bucket (220, 222, 224, 226) upon the expiration of the storage interval associated with the source historical error bucket (220, 222, 224, 226). As described above, each historical error bucket (220, 222, 224, 226) is associated with a storage interval that controls the amount of time that error information (210) can remain in a particular historical error bucket (220, 222, 224, 226). For example, in the embodiment described above in which historical error bucket (220) has a storage interval that is 60 seconds in duration, the historical error bucket (220) can only contain error information for errors that occurred within 60 seconds of the first error in the historical error bucket (220). After the expiration of the storage interval, error information must be moved to another historical error bucket (222, 224, 226). More specifically, the error information (210) in a source historical error bucket (220, 222, 224, 226) may be moved (208) to the destination historical error bucket (220, 222, 224, 226) that has a storage interval of a duration that is longer that the source historical error bucket (220, 222, 224, 226). Moving (208) the error information (210) in a source historical error bucket (220, 222, 224, 226) to a destination historical error bucket (220, 222, 224, 226) upon the expiration of the storage interval associated with the source historical error bucket (220, 222, 224, 226) may be carried out, for example, by inserting the error information (210) into the destination historical error bucket (220, 222, 224, 226) and deleting the error information from the source historical error bucket (220, 222, 224, 226).

Figure 3:
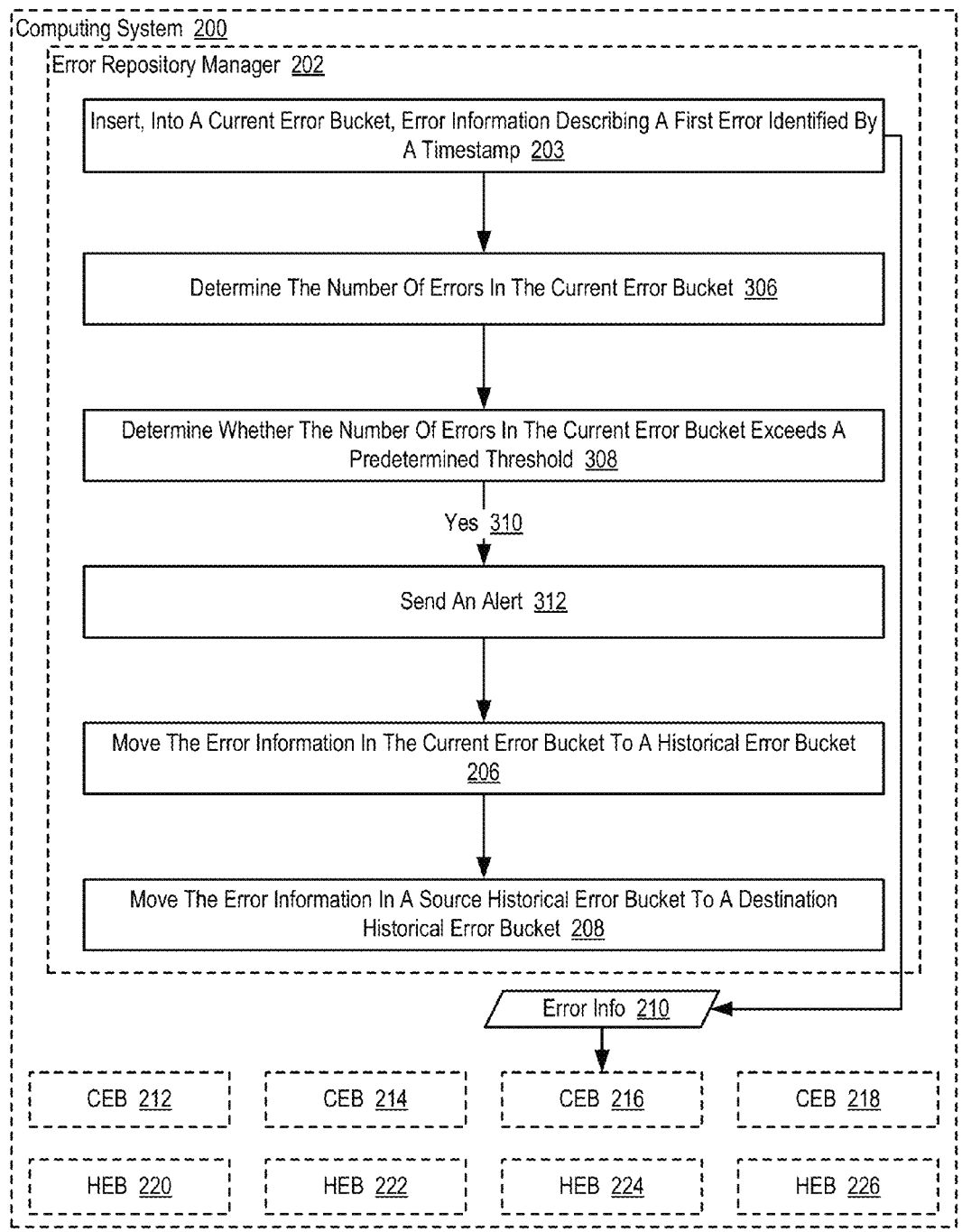
FIG. 3 sets forth a flow chart illustrating an additional example method for tracking errors in a computing system according to embodiments of the present invention.

In the example method of FIG. 3, error information (210) in a source historical error bucket (220, 222, 224, 226) can be moved (208) to the destination historical error bucket (220, 222, 224, 226) that has a storage interval of a duration that is longer than the source historical error bucket (220, 222, 224, 226) and closest in length to the source historical error bucket (220, 222, 224, 226). Consider the example described above in which historical error bucket (220) has a storage interval that is 60 seconds in duration, historical error bucket (222) has a storage interval that is 1800 seconds in duration, historical error bucket (224) has a storage interval that is 54000 seconds in duration, and historical error bucket (226) has a storage interval that is 1620000 seconds in duration. In such an example, error information (210) to be moved out of historical error bucket (220) would be moved to historical error bucket (222), error information (210) to be moved out of historical error bucket (222) would be moved to historical error bucket (224), and error information (210) to be moved out of historical error bucket (224) would be moved to historical error bucket (226).

For further explanation, FIG. 3 sets forth a flow chart illustrating an additional example method for tracking errors in a computing system (200) according to embodiments of the present invention. The example method of FIG. 3 is similar to the example method of FIG. 2, as it also includes inserting (203), into one of the current error buckets (212, 214, 216, 218), error information (210) describing a first error identified by a timestamp, moving (206) the error information (210) in the current error bucket (212, 214, 216, 218) to a historical error bucket (220, 222, 224, 226), and moving (208) the error information (210) in a source historical error bucket (220, 222, 224, 226) to a destination historical error bucket (220, 222, 224, 226).

The example method of FIG. 3 also includes determining (306), by the error repository manager (202), the number of errors in the current error bucket (212, 214, 216, 218). In the example method of FIG. 3, the error repository manager (202) may keep a counter associated with each current error bucket (212, 214, 216, 218). Upon inserting error information (210) into a particular current error bucket (212, 214, 216, 218), the error repository manager (202) may increment the counter. Upon removing all entries from a particular current error bucket (212, 214, 216, 218), the error repository manager (202) may reset the counter. In such an example, determining (306) the number of errors in the current error bucket (212, 214, 216, 218) may therefore be carried out by retrieving the counter value associated with the current error bucket (212, 214, 216, 218).

The example method of FIG. 3 also includes determining (308), by the error repository manager (202), whether the number of errors in the current error bucket (212, 214, 216, 218) exceeds a predetermined threshold. In the example method of FIG. 3, the error repository manager (202) may monitor errors generated by the computing system (200) to ensure that the computing system (200) is operating in an acceptable way. In such an example, if the computing system (200) generates too many errors in the time interval associated with a current error bucket (212, 214, 216, 218), the computing system (200) may be deemed to be operating in an unacceptable way and error handling operations may need to be triggered. In such an example, the predetermined threshold of errors for a particular error type represents the maximum amount of errors that may occur without triggering error handling operations. In such an example, determining (308) whether the number of errors in the current error bucket (212, 214, 216, 218) exceeds a predetermined threshold may be carried out by comparing the number of errors in the current error bucket (212, 214, 216, 218) to the predetermined threshold.

The example method of FIG. 3 also includes sending (312), by the error repository manager (202), an alert. In the example method of FIG. 3, sending (312) an alert is carried out in response to affirmatively (310) determining that the number of errors in the current error bucket exceeds the predetermined threshold. In the example method of FIG. 3, the error repository manager (202) may send the alert to a system administrator, an error handling program, or other entity as will occur to those of skill in the art. In such an example, the alert may include information identifying the number of errors that have been received, timestamps for each error, and so on.

Figure 4:
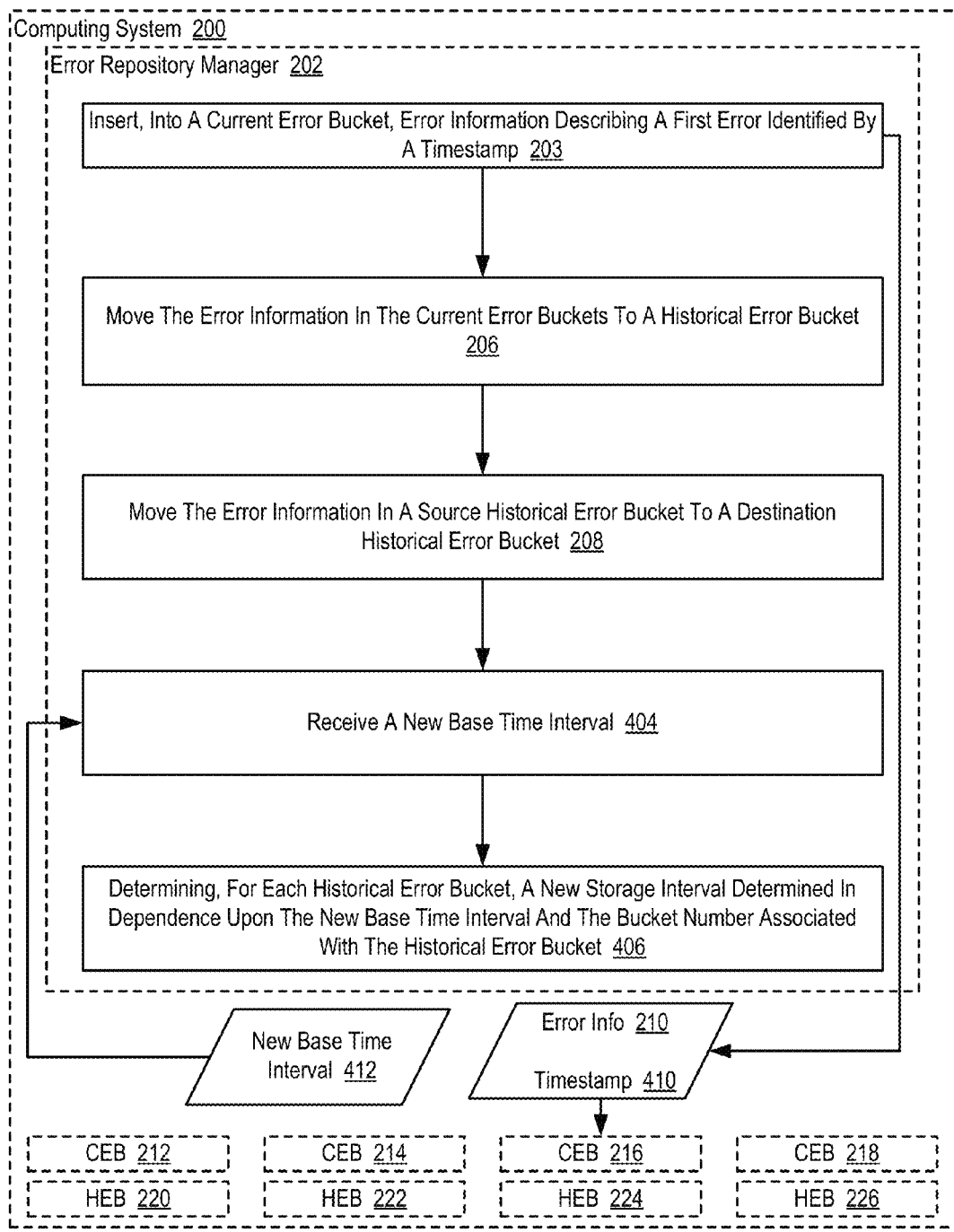
FIG. 4 sets forth a flow chart illustrating an additional example method for tracking errors in a computing system according to embodiments of the present invention.

For further explanation, FIG. 4 sets forth a flow chart illustrating an additional example method for tracking errors in a computing system (200) according to embodiments of the present invention. The example method of FIG. 4 is similar to the example method of FIG. 2 as it also includes inserting (203), into one of the current error buckets (212, 214, 216, 218), error information (210) describing a first error identified by a timestamp, moving (206) the error information (210) in the current error bucket (212, 214, 216, 218) to a historical error bucket (220, 222, 224, 226), and moving (208) the error information (210) in a source historical error bucket (220, 222, 224, 226) to a destination historical error bucket (220, 222, 224, 226). In the example method of FIG. 4, the error information (210) describing an error can include a timestamp (410) that specifies the time at which the error was generated.

The example method of FIG. 4 also includes receiving (404), by the error repository manager (202), a new base time interval (412). In the example method of FIG. 4, the new base time interval (412) may be received (404) from a system administrator that desires to alter error monitoring in the computing system (202). For example, a system administrator may decide to shorten the base time interval in a computing system (202) that requires immediate attention to errors. Alternatively, the system administrator may decide to lengthen the base time interval in a computing system (202) that is more stable and generates very few errors. In such an example, the new base time interval (412) may be received (404) by the error repository manager (202), for example, through a command line interface operated by the system administrator.

The example method of FIG. 4 also includes determining (406), by the error repository manager (202) for each historical error bucket (220, 222, 224, 226), a new storage interval determined in dependence upon the new base time interval (412) and the bucket number associated with the historical error bucket (220, 222, 224, 226). As described above, the storage interval for each historical error bucket (220, 222, 224, 226) is determined in dependence upon the bucket number for the historical error bucket (220, 222, 224, 226) and the base time interval associated with an error. In an example in which the base time interval associated with an error has been changed to a new base time interval (412), the predetermined storage interval for each historical error bucket (220, 222, 224, 226) will need to be recalculated. As such, the repository manager (202) may determine (406) the new storage interval for each historical error bucket (220, 222, 224, 226) by applying the formula for determining the duration of the storage interval using the new base time interval (412) and the bucket number associated with the historical error bucket (220, 222, 224, 226).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for tracking errors in a computing system that includes a plurality of current error buckets and a plurality of historical error buckets, the apparatus comprising a hardware computer processor, a hardware computer memory operatively coupled to the computer processor, the computer memory having disposed within it computer program instructions that, when executed by the computer processor, cause the apparatus to carry out the steps of:
   inserting, by an error repository manager into a current error bucket, error information describing a first error identified by a timestamp, wherein the current error bucket is associated with a bucket interval determined using a base time interval associated with the error measured from the timestamp;
   moving, by the error repository manager, the error information in the current error bucket to a historical error bucket upon the expiration of the bucket interval, wherein each historical error bucket has a storage interval determined in dependence upon the base time interval associated with the error and a bucket number associated with the historical error bucket; and
   moving, by the error repository manager, the error information in a source historical error bucket to a destination historical error bucket upon the expiration of the storage interval associated with the source historical error bucket.

2. The apparatus of claim 1 further comprising computer program instructions that, when executed by the computer processor, cause the apparatus to carry out the step of inserting, by an error repository manager into the current error bucket, error information describing a next error occurring within the bucket interval.

3. The apparatus of claim 1 further comprising computer program instructions that, when executed by the computer processor, cause the apparatus to carry out the steps of:
   determining, by the error repository manager, the number of errors in the current error bucket;
   determining, by the error repository manager, whether the number of errors in the current error bucket exceeds a predetermined threshold; and
   responsive to determining that the number of errors in the current error bucket exceeds the predetermined threshold, sending, by the error repository manager, an alert.

4. The apparatus of claim 1 wherein error information describing an error includes a timestamp.

5. The apparatus of claim 1 further comprising computer program instructions that, when executed by the computer processor, cause the apparatus to carry out the steps of:
   receiving, by the error repository manager, a new base time interval; and
   determining, by the error repository manager for each historical error bucket, a new storage interval determined in dependence upon the new base time interval and the bucket number associated with the historical error bucket.

6. A computer program product for tracking errors in a computing system that includes a plurality of current error buckets and a plurality of historical error buckets, the computer program product disposed upon a non-transitory computer readable medium, the computer program product comprising computer program instructions that, when executed, cause a computer to carry out the steps of:
   inserting, by an error repository manager into a current error bucket, error information describing a first error identified by a timestamp, wherein the current error bucket is associated with a bucket interval determined using a base time interval associated with the error measured from the timestamp;
   moving, by the error repository manager, the error information in the current error bucket to a historical error bucket upon the expiration of the bucket interval, wherein each historical error bucket has a storage interval determined in dependence upon the base time interval associated with the error and a bucket number associated with the historical error bucket; and
   moving, by the error repository manager, the error information in a source historical error bucket to a destination historical error bucket upon the expiration of the storage interval associated with the source historical error bucket.

7. The computer program product of claim 6 further comprising computer program instructions that, when executed, cause the computer to carry out the step of inserting, by an error repository manager into the current error bucket, error information describing a next error occurring within the bucket interval.

8. The computer program product of claim 6 further comprising computer program instructions that, when executed, cause the computer to carry out the steps of:
   determining, by the error repository manager, the number of errors in the current error bucket;
   determining, by the error repository manager, whether the number of errors in the current error bucket exceeds a predetermined threshold; and
   responsive to determining that the number of errors in the current error bucket exceeds the predetermined threshold, sending, by the error repository manager, an alert.

9. The computer program product of claim 6 wherein error information describing an error includes a timestamp.

10. The computer program product of claim 6 further comprising computer program instructions that, when executed, cause the computer to carry out the steps of:

receiving, by the error repository manager, a new base time interval; and determining, by the error repository manager for each historical error bucket, a new storage interval determined in dependence upon the new base time interval and the bucket number associated with the historical error bucket.

11. The computer program product of claim 6 wherein the computer readable medium comprises a storage medium.

\* \* \* \* \*